May 26, 1959            R. C. CARTER            2,888,633

VOLTAGE REGULATOR WITH LIMITED CURRENT DRAIN

Filed May 9, 1958            2 Sheets-Sheet 1

INVENTOR.
ROBERT C. CARTER
BY
ATTORNEY
AGENT

United States Patent Office 2,888,633
Patented May 26, 1959

2,888,633

VOLTAGE REGULATOR WITH LIMITED CURRENT DRAIN

Robert C. Carter, Irving, Tex., assignor to Collins Radio Company, Cedar Rapids, Iowa, a corporation of Iowa Application May 9, 1958, Serial No. 734,278

6 Claims. (Cl. 323—9)

This invention relates generally to power supply regulation and more particularly to a power supply employing transistor circuitry wherein voltage regulation is realized and which exhibits an additional special advantage of having a maximum current limit.

It is desirable to have some sort of safeguard on a power supply which will prevent destruction of the components in the event of overload. For this purpose, numerous electronic regulating schemes have become known in the art by which voltage regulation is realized. However, generally the prevention of destruction from overload incorporates the use of fuses or circuit breakers or other devices which generally have to be reset or replaced after removal of the overload. For power supply applications wherein heavy transients may occur, it is not desirable to have an overload prevention device which burns out or opens up and must be reset as in the case of fuses and circuit breakers.

There arises then, a need for a voltage regulator power supply into which is incorporated electronic means whereby when a maximum predetermined current limit is demanded because of load variation, the power supply itself exhibits a maximum current output limit beyond which no additional current may be drawn, while at the same time the voltage output corresponds to the IR product of the load. The supply in this case effectively becomes a constant current source of a predetermined magnitude during overload conditions. This characteristic has a desired advantage in that it prevents damage to the power supply, as well as the load circuitry. For this reason the regulated power supply to be described finds especial usage as a laboratory power supply or in equipment where overload is not uncommon.

It is a further object of this invention to provide a regulated power supply having adjustable means whereby a predetermined maximum current output cannot be exceeded under overload conditions and that further incorporates selectively variable means whereby the output voltage may be set to a desired regulated level.

The invention is featured in provision for a series regulated voltage power supply which obtains its reference voltage from a source that reduces its magnitude when a certain predetermined current is reached.

Further objects, features and advantages of the invention will become apparent from the following description and claims when read in view of the drawing, in which:

Figure 2:
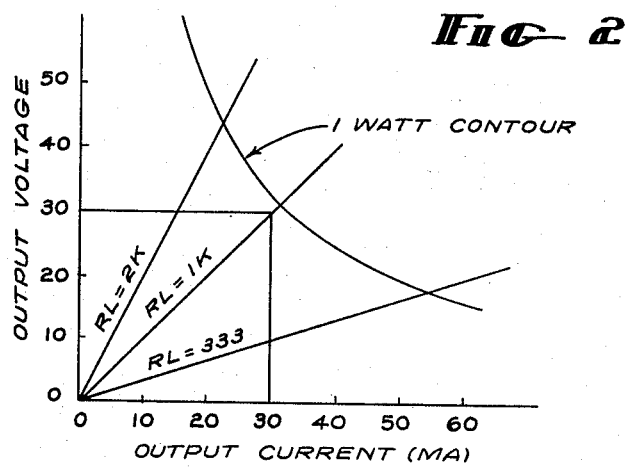
Figure 2 is a graphical presentation of the ideal output characteristics for a voltage regulated-current limited power supply of this type.

The circuit to be described has characteristics (for the ideal case) in Figure 2. In Figure 2 is illustrated, for example, a series of load lines for load resistance $R_L$ equaling 333 ohms, 1,000 ohms, and 2,000 ohms, respectively. The output characteristic for this ideal case is seen to be a rectangular characteristic wherein the output voltage is maintained over a range of output current at a fixed level until such a time as a given output current is reached and exceeded when, ideally, the output voltage drops to zero. Thus with reference to Figure 2, for a load resistance of 2,000 ohms, the output is shown to be constant at 30 volts and 15 milliamperes. For any load down to 1,000 ohms, the output voltage is seen to remain constant at 30 volts. As the load becomes less than 1,000 ohms, the output current is seen to be fixed at 30 milliamperes with a voltage corresponding to the IR product of the load. In this ideal representation, the internal resistance of the particular supply is considered to be zero for load resistances of 1,000 ohms or above, and has infinite internal resistance for loads less than 1,000 ohms.

Figure 1:
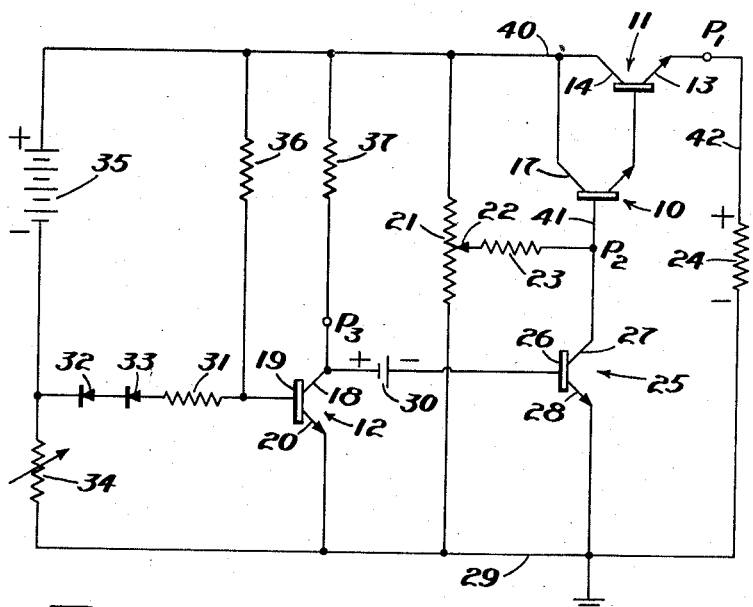
Figure 1 is a schematic representation of the regulating scheme of this invention.
Figure 3:
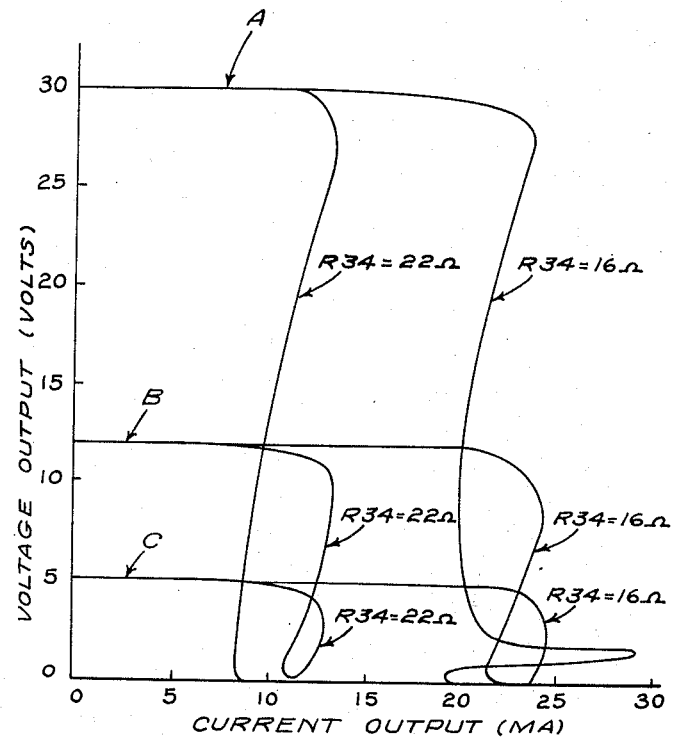
Figure 3 illustrates graphically the actual output characteristics of the circuit of Figure 1 constructed according to the principles of this invention.

The present invention, illustrated schematically in Figure 1, has successfully been employed to approximate the ideal characteristics illustrated in Figure 2. The actual characteristics of Figure 1 are shown in Figure 3 of the drawings and will be further discussed.

With reference to Figure 1 the voltage to be regulated is illustrated as a battery source 35 and, with respect to battery source 35, the load resistor 24 is seen to be serially connected with a variable resistance 34 and a transistor 11 across the terminals of the battery source 35. The output terminals of the device are seen to be the emitter 13 of transistor 11 (point $P_1$) and the common ground return of the circuit 29. A second transistor, generally designated by reference numeral 10, is seen to be connected to transistor 11 in a configuration known as a "super $\alpha$" connection such that the three leads 40, 41 and 42 coming from the two transistors 10 and 11 may be considered as being from a single transistor whose common emitter current application factor $\beta$ is equal to the product of the individual common emitter application factors of transistors 10 and 11. Connector 40 is seen to be tied to the positive terminal of the battery source 35, while connector 42 is connected to one side of the load resistor 24, the other side of which is connected to the common ground 29. The third connector 41 from the transistor configuration is connected through a resistance 23 to the wiper arm 22 of a potentiometer 21, which potentiometer 21 is connected from the connector 40 from the positive side of the battery source 35 to the common ground 29.

Connector 41 is additionally connected to the collector 27 of a third transistor 25. The emitter 28 of transistor 25 is connected to common ground 29, while the base 26 is connected through a bias battery source 30 to the collector 18 of a fourth transistor 12. Collector 18 of transistor 12 is additionally connected through a resistor 37 to the positive side of the battery source 35. The emitter 20 of transistor 12 is connected to common ground 29, while the base 19 of transistor 12 is connected through a resistor 36 to the positive side of battery source 35 and through a resistor 31 and diodes 32 and 33 to the negative side of battery source 35. The negative side of battery source 35 is connected through a variable resistance 34 to the common ground 29 to complete the circuit.

Operation of the circuit as previously mentioned is basically that of a series regulated supply wherein transistor 11, being placed in series with the load resistor 24, is made to act as a variable impedance which controls the current flowing through the load. This regulation is further tied in with control circuitry which uniquely places a maximum current limit on the supply, which limit is, within design limitations for a given circuit and given components, selectively variable.

The operation of the circuit is as follows: Transistors 10 and 11, as previously discussed, function as a single transistor whose common emitter current application factor is equal to the production of the individual factors of transistors 10 and 11. Since transistor 11 is the transistor actually in series with the supply voltage and load, it must have a current capacity which will handle the maximum supply current which would occur during short circuit. Transistor 10 need not have as great a current capacity as transistor 11, but as seen in Figure 1, the collectors 17 and 14 of transistors 10 and 11 are tied together and connected in common through connector 40 to the positive side of the battery supply 35 and, hence, transistors 10 and 11 must have the same collector voltage rating.

The load, as illustrated by resistor 24, is in the circuit of the emitter 13 of transistor 11 and thus effectively in the emitter circuit of the combination circuit of transistors 10 and 11. The combination of transistors 10 and 11 thus acts as an emitter follower (grounded connector) stage. The emitter voltage of transistor 11, that is the voltage at point $P_1$, will be approximately equal to the base voltage of the combination, that is the voltage on base 41 of transistor 10. The voltage at point $P_2$ is controlled by the setting of wiper arm 22 on potentiometer 21. Very little voltage drop occurs across resistor 23 since the transistor 10—11 combination requires very little current to control the load current, the requirement being in the microampere range. Potentiometer 21 forms a bleeder across battery source 35 to obtain a portion of the battery voltage. Emitter 13 of transistor 11 "follows" base 41 of transistor 10 to obtain the output voltage at point $P_1$.

Transistors 25 and 12 and their associated circuitry comprise the current limiting circuitry of this invention. For light loads, that is for high values of load resistor 24, transistor 25 is non-conducting and transistor 12 is heavily conducting. The potential on the collector of transistor 12 (and point $P_3$) is near ground potential due to the heavy state of conduction of transistor 12 and bias battery source 30, connected from the base 26 of transistor 25 through transistor 12 to ground, assures transistor 25 to be in the cutoff state as long as transistor 12 is heavily conducting. The "on" bias for transistor 12 is supplied through resistor 36 which is tied to the positive terminal of battery source 35. It is noted that the base 19 of transistor 12 is connected through a resistor 31 and diodes 32 and 33 to the negative side of the voltage supply 35. Although diodes 32 and 33 are connected in the direction for easy current flow from resistor 36, the diodes will not conduct until approximately 1.2 volts is applied in the forward direction across the combination. This latter characteristic is common to all silicon junction diodes. The potential of base 19 of transistor 12 is then, through choice of circuit parameters, in the vicinity of .05 volt during its state of heavy conduction.

Now as the load current through load resistor 24 increases, the voltage drop across resistor 34, which is in series with the supply voltage 35 and the load resistor 24, additionally supplies the potential necessary to allow diodes 32 and 33 to conduct. The bias is thus removed from transistor 12 and transistor 25 is effectively biased into conduction from its cutoff state, thus loading down the potential at point $P_2$ in the base connection of control transistor 10. This, due to the interconnection between the transistors 10 and 11, reduces the potential at point $P_1$ in the emitter connection of transistor 11. Resistor 31, previously described as being in series between the diodes 32 and 33 and the base 19 of transistor 12, is included in the circuit to prevent diodes 32 and 33 from switching all of the current at the first point of conduction. The removal of resistor 31 causes a point of discontinuity in the output characteristic as the load is varied.

Variable resistor 34 which is in series with the battery supply source 35 and the load resistor 24 is included for the purpose of changing the maximum current limit. Potentiometer 21, by adjustment of its wiper arm 22, permits a selective variation in the controlled output voltage level. It becomes apparent from the circuitry described that transistor 11 which is serially connected between the supply voltage 35 and the load 24 must have a wattage rating greater than the product of the maximum short circuit current and the voltage source 35. Calculations for power handling requirements for transistor 11 may be made from the expression:

$$P = (E_{35} - E_0)(I_0)$$

where $E_{35}$ is the voltage of the battery source, $E_0$ is the lowest desired regulated voltage output, and $I_0$ is the highest desired output current.

As discussed above, potentiometer 21, which is placed across the voltage source to effect a sampling of the source for output control, effectively functions as a reference voltage for the operation of the transistor 10—11 network and in this instance provides a selectively variable control for the output voltage. It is realized, however, that the same principle enables a non-adjustable voltage power supply according to this invention, wherein potentiometer 21 and resistance 23 may be replaced by a fixed voltage reference, such as, for example, a Zener diode voltage reference. In this latter instance, the potentiometer 21 might be replaced by a network consisting of a current limiting resistor serially connected with a Zener diode from connector 40 to ground, the cathode of the diode being grounded. The Zener diode plate would be tied to the base 15 of transistor 10; that is point $P_2$ in Figure 1. Zener diodes have the well-known characteristic of becoming conductive once a given voltage across the diode is reached and act as a voltage regulated source for this particular value of voltage. Were a Zener diode employed as described, the bias battery 30, shown in Figure 1, would not be needed since transistor 25 would be allowed to draw a slight current without affecting the potential at $P_2$.

Although the circuitry has been illustrated and described as including NPN transistors, it is realized that PNP transistors might be employed as well; in which case, the supply to be regulated would be of opposite polarity to that shown in Figure 1.

A circuit according to the above principles and as illustrated in Figure 1 was constructed with the following parameter values:

| | |
|---|---|
| Voltage source 35 | 45 volts. |
| Diodes 32, 33 | Type 1N137. |
| Resistor 31 | 15,000 ohms. |
| Resistor 36 | 750,000 ohms. |
| Resistor 37 | 22,000 ohms. |
| Bias source 30 | 1.5 volts. |
| Potentiometer 21 | 10,000 ohms. |
| Resistor 23 | 5,000 ohms. |
| Transistor 12 | Type 904. |
| Transistors 10, 11 | Type 953. |

Figure 3 illustrates the resulting output characteristics from readings taken on the circuit. It is noted that generally three families of curves designated as A, B and C are shown and in each instance the potentiometer 34 was set at 22 ohms and 16 ohms. The output voltage levels A, B and C were obtained from three distinctly related settings of potentiometer 21. It is noted that with the potentiometer 34 set for 22 ohms, the maximum current level occurred between 10 and 15 milliamperes, and that with potentiometer 34 set for 16 ohms the maximum current point appeared between 20 and 25 milliamperes. It is noted that the resulting output characteristics approach quite effectively the ideal rectangular characteristic illustrated in Figure 2 of the drawing.

It is seen that by this invention a voltage regulated power supply means employing transistors is realized wherein the output voltage is regulated over a variable range and which additionally includes the decidedly advantageous feature of having a maximum current limit. When the load is increased such that the load demands a current in excess of the limiting current, no additional current may be drawn to damage the supply and, in addition, the output voltage drops in proportion to the load increase, such that neither the supply nor the load is damaged.

Although this invention has been described with respect to a particular embodiment thereof, it is not to be so limited as changes and modifications may be made therein which are within the full intended scope of the invention as defined by the appended claims.

I claim:

1. A regulated power supply comprising a source of direct current potential, a load impedance having one side thereof serially connected through the emitter-collector circuit of a transistor to a first terminal of said potential source and the remaining side thereof through a first variable resistance voltage reference means to the second terminal of said potential source, a second variable resistance voltage reference means connected as a bleeder network across said source of direct current potential, said second voltage reference means applying a potential proportional to said source of direct current potential to the base of said transistor whereby the emitter voltage of said transistor is a function of said reference voltage, the voltage drop across said first variable resistance voltage reference means connected to control further bias control means, said further bias control means connected to the base of said first transistor and including switching means to load down the base potential of said first transistor upon the current through said load impedance and said first variable resistance voltage reference means reaching a predetermined level.

2. A regulated power supply comprising a source of direct current potential, one terminal of said source of potential connected through the collector-emitter circuit of a transistor to one end of a load impedance, the other terminal of said source of potential connected through a variable impedance to the other end of said load impedance, voltage reference means connected across said source of direct current potential as a bleeder network and furnishing a biasing potential between the collector and base of said transistor, said variable impedance providing a second reference voltage as a function of load current, said second reference voltage operating second biasing means operably connected to the base of said transistor whereby the voltage across said load impedance is a function of said first reference voltage means and the current through said load impedance is limited at a preselected value as a function of the value of said variable impedance.

3. A regulated power supply comprising a source of direct current potential having a first terminal serially connected with a load impedance through the collector-emitter circuit of a first transistor and the second terminal connected through a variable resistance to the ground return of said load impedance, a voltage reference means connected across said direct current potential source and said variable resistance, said variable voltage reference supplying a bias voltage between the collector and base of said first transistor whereby the emitter voltage of said first transistor is a function of said variable reference voltage, a second transistor with emitter-collector circuit connected between the base of said first transistor and the ground return for said load impedance, means controlling the conductivity state of said second transistor as a function of the voltage across said variable resistance whereby the voltage across said load is a function of said variable voltage reference means and the current through said load is limited at a preselected value as a function of the value of said variable resistance.

4. A regulated power supply comprising a source of direct current voltage, the first terminal of said potential source serially connected through a variable resistance to a common ground, the second terminal of said potential source serially connected through the collector-emitter circuit of a first transistor to a first load terminal, the other terminal of said load returned to said common ground, the base of said first transistor returned through the collector-emitter circuit of a second transistor to said common ground, voltage reference impedance means connected between said second terminal of said potential source and said common ground and supplying a voltage proportional to said potential source to the base of said first transistor, a second voltage reference means connected between said first terminal of said direct current potential source and said common ground, said second voltage reference means including a threshold sensitive means whereby the conductivity state of said second transistor is switched from one of high conductivity to one of low conductivity as the current through said load impedance exceeds a predetermined value.

5. A regulated power supply comprising a source of direct current potential, a load impedance having one terminal thereof connected through the emitter-collector circuit of a first transistor and a second terminal thereof connected through a variable resistance across said source of direct current potential, a second voltage reference means connected across said series connection of said direct current potential source and variable resistance, means connecting the output from said voltage reference source to the base of said first transistor, a bistable transistor switching means including second and third transistors with bias control means to reverse the conductivity states thereof as a function of the magnitude of the current through said load impedance, one transistor of said bistable switching means serially connected between the base of said first transistor and the second terminal of said load impedance whereby the conductivity state of said first transistor is further controlled as a function of said load current and said load current is limited to a predetermined value as established by the magnitude of said variable resistance.

6. A regulated power supply comprising a source of direct current potential, a first terminal of said voltage source serially connected through the collector-emitter circuit of a first transistor to a first terminal of a load impedance a second terminal of said direct current potential source serially connected through a variable resistance to a common ground, a second terminal of said load impedance connected to said common ground, a variable voltage reference means connected from the first terminal of direct current voltage source to said common ground, said variable voltage reference means supplying a reference voltage between collector and base of said first transistor whereby the emitter voltage of said first transistor is a function of said reference voltage, a second transistor with emitter-collector circuit connected between the base of said first transistor and said common ground, a forwardly biased third transistor with emitter-collector circuit connected between said first terminal of said direct current voltage source and said common ground, the base of said second transistor serially connected through a source of reverse bias and the emitter-collector circuit of said third transistor to said common ground, threshold sensitive unilateral conducting means connected between the base of said third transistor and the second terminal of said direct current voltage source whereby load current of predetermined magnitude through said variable resistance substantially overcomes said forward bias on said third transistor to render it non-conductive and thus remove said reverse bias from said second transistor to increase its conductivity state and load down the base potential of said first transistor.

No references cited.